United States Patent
Listou

(10) Patent No.: US 8,060,819 B2
(45) Date of Patent: *Nov. 15, 2011

(54) METHOD FOR AUTOMATED PERMUTATION OF COMPUTERIZED LISTS OF TEXT DATA OBJECTS WITH SELECTED COLUMNS OF IMAGED PARAMETRIC DATA EXCLUDED FROM SORTING

(75) Inventor: Robert Eugene Listou, Washington, DC (US)

(73) Assignee: Execware, LLC, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/699,973

(22) Filed: Feb. 26, 2010

(65) Prior Publication Data

US 2011/0214049 A1    Sep. 1, 2011

(51) Int. Cl.
*G06F 17/27*    (2006.01)

(52) U.S. Cl. ......... 715/227; 707/735; 707/736; 707/752
(58) Field of Classification Search .................. 715/227; 707/736, 737, 752
See application file for complete search history.

(56) References Cited

U.S. PATENT DOCUMENTS 6,134,564 A * 10/2000 Listou ........................ 715/236

OTHER PUBLICATIONS

Ron Person; Special Edition Using Microsoft Excel 97; Dec. 17, 1996; Que Publishing; pp. 865-877.*

* cited by examiner

*Primary Examiner* — Doug Hutton, Jr.
*Assistant Examiner* — Andrew Dyer
(74) *Attorney, Agent, or Firm* — SNR Denton US LLP

(57) ABSTRACT

A method for a computer generated data table of parametric text data objects to be permuted based on automated sorting of a lesser number of parameters than are imaged on the data table.

2 Claims, 2 Drawing Sheets

METHOD FOR AUTOMATED PERMUTATION OF COMPUTERIZED LISTS OF TEXT DATA OBJECTS WITH SELECTED COLUMNS OF IMAGED PARAMETRIC DATA EXCLUDED FROM SORTING

CROSS-REFERENCE TO RELATED APPLICATIONS AND PATENTS

Patent application Ser. No. 08/561,178
Patent application Ser. No. 09/325,358
U.S. Pat. No. 6,134,564
U.S. Pat. No. 6,216,139

BACKGROUND OF THE INVENTION

The locus of the present invention is described in claim 1 of the cross-referenced patent application Ser. No. 09/325,358, granted as U.S. Pat. No. 6,134,564. It is a series of computer-generated lists of text data objects on data tables that are manually or automatically imaged at a selected speed for human discovery of meaningful interrelations of parameter values and/or text data object names. The present invention is a means by which the computer user viewing a series of such permutations chooses to retain in sight a plurality of columns of parametric values but reduces the number of possible permutations by signaling the computer to exclude selected columns from sorting.

The data table addressed by the present invention is one component of the several required for the mind-centric analytic methodology described in cross-referenced U.S. Pat. No. 6,216,139. That methodology, named contextual data modeling (CDM) by the present inventor, is explained in detail in cross-referenced U.S. Pat. No. 6,134,564. It is a systemized form of computer-aided morphological analysis that deals with parametric objects in an orderly way in which no interrelations of their parameter values and/or identifiers on a data table are ignored by the user, during the visual examination of imaged data that leads to the reasoned conclusions, a priori as being unimportant. Said text data objects are any type of physical bodies, events, ideas, or any other entities that have unique identifying names or numbers, plus parameters such as weight, material, location, date, age, importance, etcetera. It will be apparent that such "evidence items" exist in many fields of human endeavor that involve analysis, investigation, research, investigation, and supervision and that many interrelations of parametric values and/or names are possible. The present applicant believes a review of CDM herein, and comparison with operation of spreadsheet programs, provides conceptual and functional background important for assessment of the merit of the present invention as an improved component of CDM.

Existing electronic spreadsheet programs, such as Microsoft EXCEL™, also generate tabular displays of text and numeric data. The data elements from which such tabular displays are generated by such spreadsheet programs and by embodiments of cross referenced U.S. Pat. No. 6,134,564 consist of unitary human readable textual and/or numeric expressions, suitable for insertion into intersections of the rows and columns, commonly called cells. Examples of such data elements are "Smith," "steering assy," and "64993765." The user of spreadsheet programs inserts said data elements into appropriate cells and after all desired data are entered, the user can signal the computer to sort the data in one or several columns in order to generate displays that conform with criteria specified by the user. The typical end result is a single or small number of tabular displays that meet pre-conceived needs.

In CDM, the mind of the computer user, not the computer, analyzes a dataset to discover all meaningful interrelations, such as groups, sequences, similarities, etcetera. Neuroscience teaches that what a person sees, hears, and thinks is profoundly shaped by that person's beliefs and expectations. Consequently, the merit of each interrelation is determined by the user in the context of that person's semantic, episodic, and procedural memory (knowledge, experience, and skills) as well as emotion. The user's intuition, imagination, and reasoning then lead to user-controlled iteration of permutations, and modeling/manipulation of the imaged data to synchronize it with the user's reasoning.

The modeling consists of editing text and adding colors to text, fields, rows, or columns and re-examining all or selected revised tables. For example, a user's reasoning can lead to changing a parameter value "76" to "75" to support re-sorting that relocates that data object into a group of others with the value "75" for the same parameter. Further, the user is optionally able to then color the "76" to indicate that it is a temporarily changed number. Modeling continues until the user has identified and evaluated all possible meaningful interrelations.

The number of permutations on a data table is determined by the mathematical factorial expression "n factorial", or n!, in which n is the product of the numbers 1 through n. Thus a table with three columns has (1×2×3) 6 permutations, four columns have (1×2×3×4) 24 permutations, five columns have 120 permutations, and so forth. It is apparent that it is a difficult task for a person to manually signal the computer 720 times, for example, to generate and study each of the 720 permutations of a data table with 6 parameters, or to so examine all 40,320 permutations of a table with 8 parameters. In addition to being tedious, the user's working memory will retain awareness of few data perceived on all but the most recently examined permutations. In any case, however, the computer user may require, for the integrity of the human analysis, that all displayed columns of parametric values remain in the user's field of vision although not all are sorted during permutation of the columns. The present invention satisfies that need.

Figure 1:
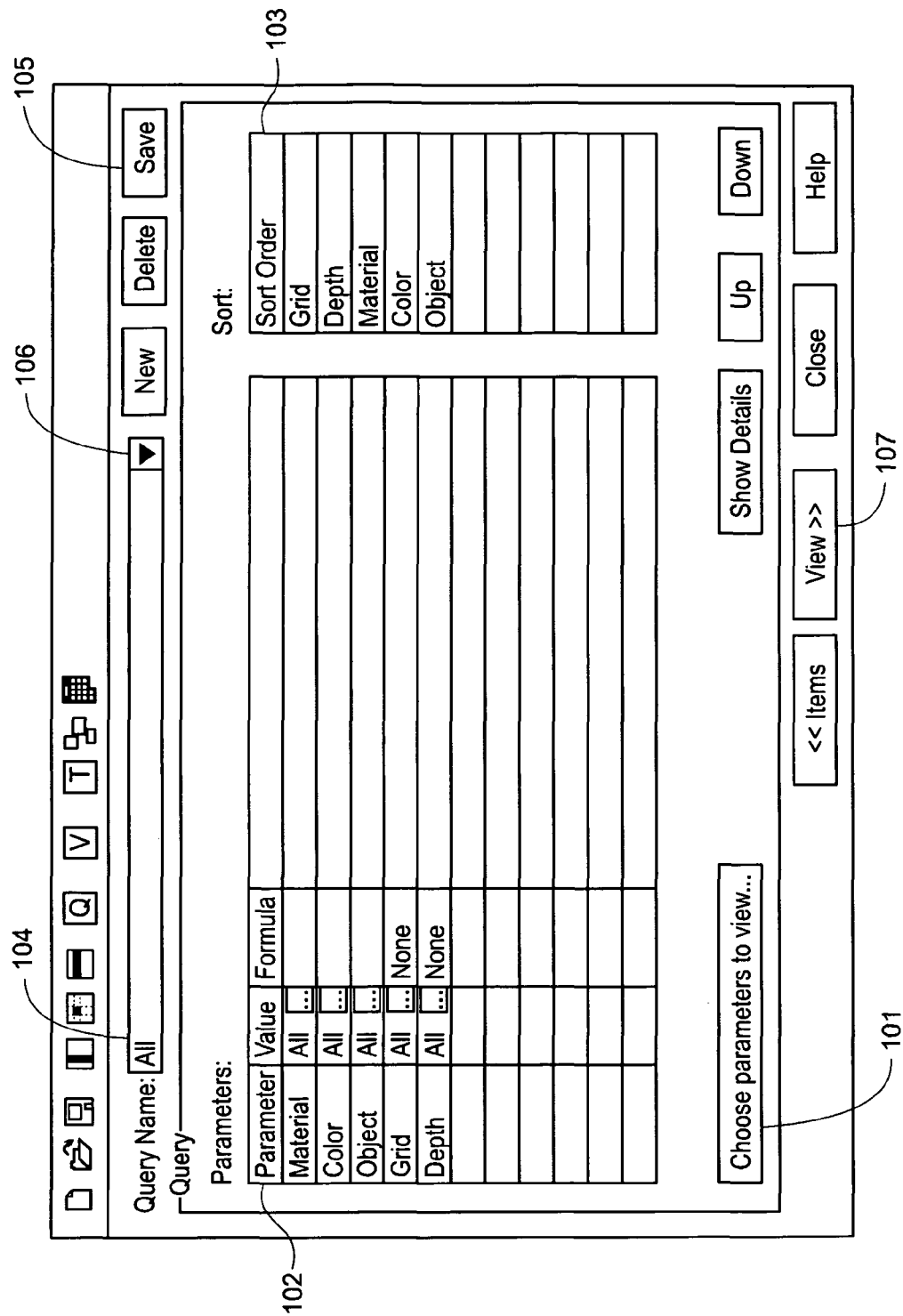
FIG. 1 depicts means for signaling the computer to generate a data table with content as desired by the user. Combining in such a dialog box the means to select from a set of records of text data objects those to be displayed on a data table, plus the means to designate the initial sort order for automated permutation, are addressed in cross-referenced U.S. Pat. No. 6,216,139.

To examine a maximum number of permutations less than 120 the user can specify, with the dialog box in FIG. 1, fewer parameters to be included on the data table. But it may be desirable to have all parameters in view on FIG. 2. The objective of the present invention is to enable concurrent visual examination of all parameters but with exclusion of some parameter values from sorting. As an extreme example, from a dataset of text data objects with 10 parameters n user can select 8 parameters for examination with automated permutation, and because that would require viewing 40,320 permutations the user can, while still viewing all 8 parameters, exclude 3 from sorting. The result will be 120 different tables to examine. Enabling such selective imaging is the objective of the present invention.

DETAILED DESCRIPTION OF THE INVENTION

After creating, or opening a saved, dataset of text data objects with a plurality of parameters, the user clicks (101) to view a list of available parameters as depicted in the "Parameter" column at (102). The user then selects those the computer is to identify and retrieve text data objects to be listed on a data table. Familiar to those skilled in the art are means, such as adjacent to (102), to limit the imaging of text data objects on a data table to those with singular parametric values or satisfying one of selected preset formulas such as "Greater or equal," "Less than," etcetera. The initial order of the columns of parameter values on the data table, thus the initial order of sorting by the computer, is specified at (103). This discrete specification of select and sort criteria is named at (104) and saved (105). A list of such saved discrete specifications is available at (106). With the desired select and sort criteria in view the user clicks (107) to signal the computer to generate a data table, FIG. 2, that satisfies the chosen select and sort criteria.

Figure 2:
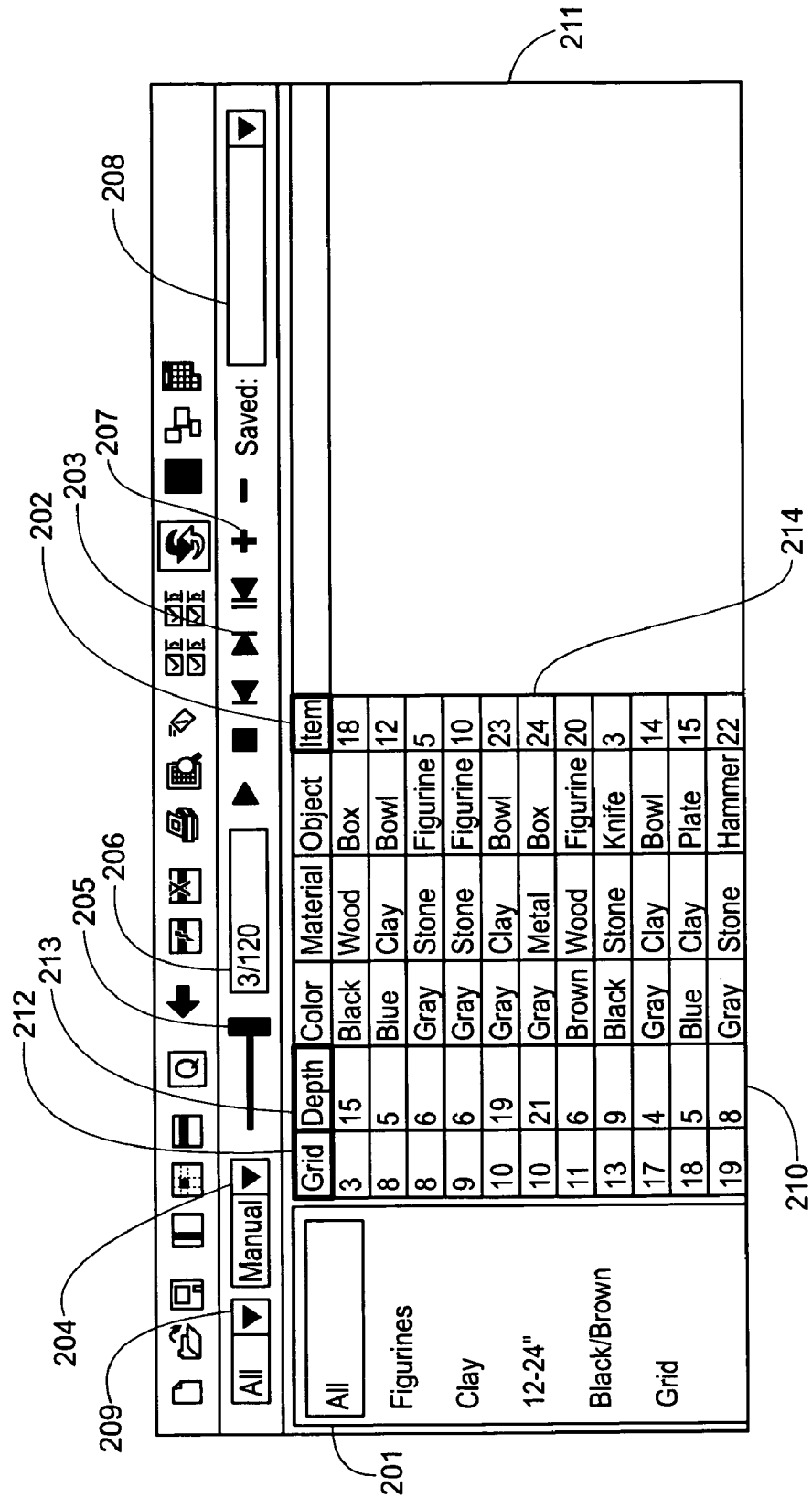
FIG. 2 is a data table generated according to specifications entered in the dialog box in FIG. 1. Such a data table is used for visual discovery of meaningful relationships in the parameter values and in the identifiers, or names, of the listed text data objects. The names of the objects (called "Items" on FIG. 2) are in the far right column. To the left of the item names are the values of their 5 parameters. Permutation of the table, either manually or automatically per cross-referenced U.S. Pat. No. 6,134,564, will display, in this example, up to 120 different column arrangements to the user.

On the resulting data table, FIG. 2, the name of the select and sort specification chosen by the user is displayed and highlighted at (201). The user may have chosen to create and save, thus making immediately accessible, data tables defined in FIG. 1, the names of which are below (201). The identifiers (names, numerals, and/or symbols) of the associated text data objects are listed on the data table in the last column (202), preceded by the columns of parametric values. With the initial column arrangement as specified at (103) and, in this example, 120 such permutations of the 5 parameters to be examined, the user signals the computer at (203) and adjacent arrow icons to generate and image the next permutation configured according to an ordering algorithm incorporated in the software. A user preferring automated imaging of permutations clicks (204), then clicks "Auto" in an imaged drop-down menu. The user then controls, with the slider at (205), the rate of automated sequencing according to the ordering algorithm. The relative position of a currently viewed permutation in the ordering algorithm is indicated at (206), thus in the present example the table in FIG. 2 is the 3$^{rd}$ of 120 possible permutations.

By means familiar to those skilled in the art, the user edits text and adds color to text, fields, and rows as desired to assist in his or her evolving reasoning. Such variants of the same permutation can be named by clicking (207), which enables entry of a name on the "Saved" field drop-down list (208). Later the user selects a saved variant to be imaged by clicking (209), then the word "Saved", which causes a drop-down list of saved variants to be imaged:

If the imaging of text data objects on the data table exceeds the vertical size of the window, the lower edge (210) of the window can be dragged down. Similarly, if the number of columns of parametric data and/or the width of said columns requires, the right edge (211) of the window can be dragged to the right. Consequently the number of items that can be concurrently examined, the number of their parameters, and the size of parametric value fields are limited only by the size of the monitor on which the data table is imaged.

The manipulation of imaged data to visually discover meaningful relationships, or potential relationships reflects the reasoning of the user. As an example of reasoning, the user examining FIG. 2, in which the "Items" listed on the data table are numbered physical objects retrieved from a hypothetical archeological site, can conclude that because "Item 14" and "Item 15" were retrieved from measured locations, as in adjacent "Grids," possibly only inches apart, and at approximately the same "Depth," and that the items consist of "Clay" is probably correct, the other assigned values of "Type" and "Color" are less certain. The user can further reason that because both objects are probably "Clay" they may be parts of the same object, i.e. a "Bowl" or a "Plate," and they both may be either "Gray" or "Blue." To reflect his or her personal reasoning, the user can manipulate the imaging of the data table by editing text and/or coloring text, fields, rows, or columns and again permuting the table to perceive the effect on other of the 120 permutations. That may lead to physical examination of both physical objects. Alternatively, it could lead to examination of their images, if available as described in cross referenced U.S. Pat. No. 6,134,564; especially if the images are 3-dimensional and subject to manipulation by the user.

Because in the first two columns, the "Grid" and "Depth" parameters, the parametric values can be considered relatively accurate, the user has, with the present invention, clicked the name fields, (212) and (213), of those two columns. That causes those names to be clearly distinguished from other such fields by means such as a unique background, accented border, and/or bold letters. Concurrently the computer is automatically configured to maintain static imaging of those columns and base further permutation on an ordering algorithm for the other three parameters, thus generating six different arrangements of the "Color," "Material," and "Object" columns. Because excluding selected parameters from sorting has the effect of locking their values to the identifiers of the text data objects they describe, automatically marking (202) in the same fashion when (212) or (213) are clicked can aid perception of that relationship. Because parameters selected for exclusion from permutation by the present invention can be those located anywhere on the data table, the user may choose to predetermine excluded parameters during initial specification of sort order at (103) and locate them last in the initial sort order, thus adjacent to the column of text data object identifiers at (202).

It is apparent that the users' reasoning about manipulation of text data displayed on a plurality of data tables for visual discovery of meaningful relationships incorporates only the visible data about the identifier and parametric values of the listed text data objects. If the user wishes additional information, clicking the identifier (214) of a text data object signals the computer to image a dialog box, such as described in cross-referenced U.S. Pat. No. 6,216,139, which is the source of the computer record of that text data object. Functioning as the source of the row on the data table imaging the parameter names and values, the said dialog box contains an expandable field for entry of associated text such as further description, comments, etc. The dialog box also contains a list of other related text data objects, the dialog boxes of which can be viewed by clicking the object names on the list. Such dialog boxes are cited herein because imaging concurrently the data table and a dialog box increases the amount of data in the user's working memory while using the present invention to permute data tables, thereby increasing the merit of said invention.

It will be apparent to those skilled in the art that the invention described herein increases the scope and integrity of human visual analysis of data tables of text data objects and, optionally, associated dialog boxes by maintaining user visibility of all parametric data a plurality of data about text data objects while reducing the number of permutations to be examined. It will also be apparent that the present invention is not limited to the specific embodiments discussed herein, and that various modifications can be made to this invention without departing from the spirit or scope of the invention.

What I claim as my invention is:

1. A method for using a computer system to display a sequence of views of automatically generated permutations of a table of data objects, wherein selected columns of parametric values of the data objects are excluded from automated permutation, the method consisting of:
   a. in response to a query, displaying a table, said table having a number of rows and columns, each row including respective ones of the parametric values for a respective one of the data objects and each column representing a parameter;
   b. in response to a selection of at least one of the columns of the table to be excluded from automated sorting of the data objects within the table, wherein at least two of the columns are not selected for exclusion from said automated sorting, indicating that the selected at least one column has been excluded from said automated sorting;
   c. in response to an indication to perform the automated sorting, automatically generating a plurality of permutations of the table, said permutations being representations of the table sorted according to the parameters other than one or more parameters represented by the at least one column selected for exclusion from the automated sorting, wherein the number of permutations of the table is equal to all possible permutations of column order excluding said at least one column that has been excluded from said automated sorting;
   d. displaying a view of a first one of the permutations of the data table, wherein the one or more parameters represented by the at least one column selected for exclusion from the automated sorting are included in the view of the first one of the permutations of the data table;
   e. responsive to an indication to display a second one of the permutations of the data table, displaying a view of the second one of the permutations of the data table, wherein the one or more parameters represented by the at least one column selected for exclusion from the automated sorting are included in the view of the second one of the permutations of the data table; and
   f. responsive to further indications to display others of the permutations of the data table, displaying respective further views of the respective further ones of the permutations of the data table, wherein the one or more parameters represented by the at least one column selected for exclusion from the automated sorting are included in the respective further views of the respective further ones of the permutations of the data table.

2. A method for using a computer system to display a sequence of tables of data objects wherein selected columns of parametric values are excluded from automated permutation, consisting of:
   a. selecting a data set to be displayed in a table containing a plurality of columns;
   b. displaying a default list of columns to be sorted;
   c. selecting at least one of the plurality of columns from the default list of columns to be excluded from sorting, wherein at least two of the plurality of columns are not selected for exclusion from sorting;
   d. indicating on the default list of columns that the selected at least one column has been excluded from sorting;
   e. generating a plurality of sorted tables based on the columns not selected for exclusion, wherein the number of sorted tables is equal to all possible permutations of column order and each sorted table is different from all other sorted tables;
   f. displaying a first sorted table from the plurality of sorted tables, wherein the columns excluded from sorting are placed at the end of the table;
   g. receiving an indication to replace the displayed first sorted table with a second sorted table from the plurality of sorted tables;
   h. displaying the second sorted table, wherein the columns excluded from sorting are placed at the end of the table; and
   i. editing at least one cell to change the cell's value or formatting.

* * * * *